United States Patent [19]

Skrentner et al.

[11] 3,884,590

[45] May 20, 1975

[54] ADJUSTABLE DUAL TOOL BORING BAR

[75] Inventors: Frank C. Skrentner, Bloomfield Hills; Werner W. Willuweit, St. Clair Shores, both of Mich.

[73] Assignee: F. Jos. Lamb Company, Warren, Mich.

[22] Filed: May 22, 1974

[21] Appl. No.: 472,077

[52] U.S. Cl. ............ 408/8; 408/13; 408/150; 408/158
[51] Int. Cl. ............................. B23b 47/00
[58] Field of Search ............ 408/3, 8, 10, 13, 147, 408/150, 153, 158, 161, 173, 178

[56] References Cited
UNITED STATES PATENTS

| | | |
|---|---|---|
| 3,640,633 | 2/1972 | Gersch et al. ............... 408/150 |
| 3,700,345 | 10/1972 | Schubert ..................... 408/161 |
| 3,740,161 | 6/1973 | Milewski ..................... 408/158 |

*Primary Examiner*—Gil Weidenfeld
*Attorney, Agent, or Firm*—Barnes, Kisselle, Raisch & Choate

[57] ABSTRACT

A machine tool having a boring bar mounted for rotative adjustment on a rotary spindle with its axis offset from the axis of the spindle. The boring bar is mounted on the spindle by means of a helically splined nut. A helically splined shaft is engaged with the nut to rotate it relative to the spindle in response to axial displacement of the shaft. Diametrically opposed cutting tools are mounted on the boring bar. When the nut is rotated through 180° the positions of the two tools are reversed, one being retracted radially inwardly and the other advanced radially outwardly.

14 Claims, 11 Drawing Figures

ADJUSTABLE DUAL TOOL BORING BAR

This invention relates to a machine tool boring spindle and, more particularly, to an adjusting means so arranged as to individually automatically adjust a plurality of tools on a single boring bar to effect desired dimensional changes of the machined bore.

In the machining of workpieces a situation is often encountered where two coaxial bores are of different diameters and each has a shoulder at its end. The two shoulders separate the two bores and have a requirement that they be square with the axes of the respective bores and be parallel with each other. A typical workpiece with these requirements is a pinion carrying portion of an automotive differential housing. The pinion is mounted on its short shaft, journalled in two angular contact bearings loaded with a nut on the shaft and the resulting load thus imposed on the inside races of the bearings is transferred through the rolling members of the bearings to the outside races which in turn are located and separated by the shoulders at the end of the bores that carry the outside races in the housing of the assembly. It can readily be seen that the diameters of the holes containing the bearings must be held to very close tolerances and at least one of the shoulders must be accurately located in an axial direction so that the relationship of the two gears of the hypoid set to be contained in the housing can be closely controlled. The accurate coaxial alignment required of the two bearing bores requires that they both be machined while the workpiece remains chucked at the same machining station and, preferably, by the same tool carrying boring bar. The best bearing mounting practice dictates that the shoulders against which the outer races of the bearings abut should be square, smooth and free from chatter marks which often occur if the shoulder faces are formed by a simple plunge cut of the cutting tool. These chatter marks and a generally rough finish can best be eliminated by the practice of retracting the single point tool that has made the plunge cut radially towards the center of the bore while the tool is still rotating. This allows the point of the cutting tool to generate a perfectly flat shoulder surface exactly square with the axis of the bore that has been machined by the same tool on the same boring bar.

It will be understood that the invention is not limited to the solving of the specific problem outlined above, but encompasses all of the combinations of close tolerance coaxial bores and faces ending at shoulders. This includes single bores with or without shoulders and multiple bores with a single shoulder.

It is an object of the invention to provide a boring spindle arrangement having the ability to automatically adjust the tool in a direction to maintain the prescribed diametrical tolerance of the hole that it is machining without interrupting the cycle of the machine.

A further object is to provide a boring spindle assembly adapted to spirally machine a shoulder at the end of a bore with the same single point tool that machined the bore.

Another object of the present invention is to automatically change the size of more than one bore that is being machined during the course of the normal cycle of the machine.

Still another object is to provide the ability to machine more than one shoulder with the same tools that have bored the in-line holes to the shoulders, all within the normal single cycle.

These and other objects and advantages of this invention will be readily understood by those acquainted with the design and use of boring spindles from the following specification and accompanying drawings.

Figure 1:
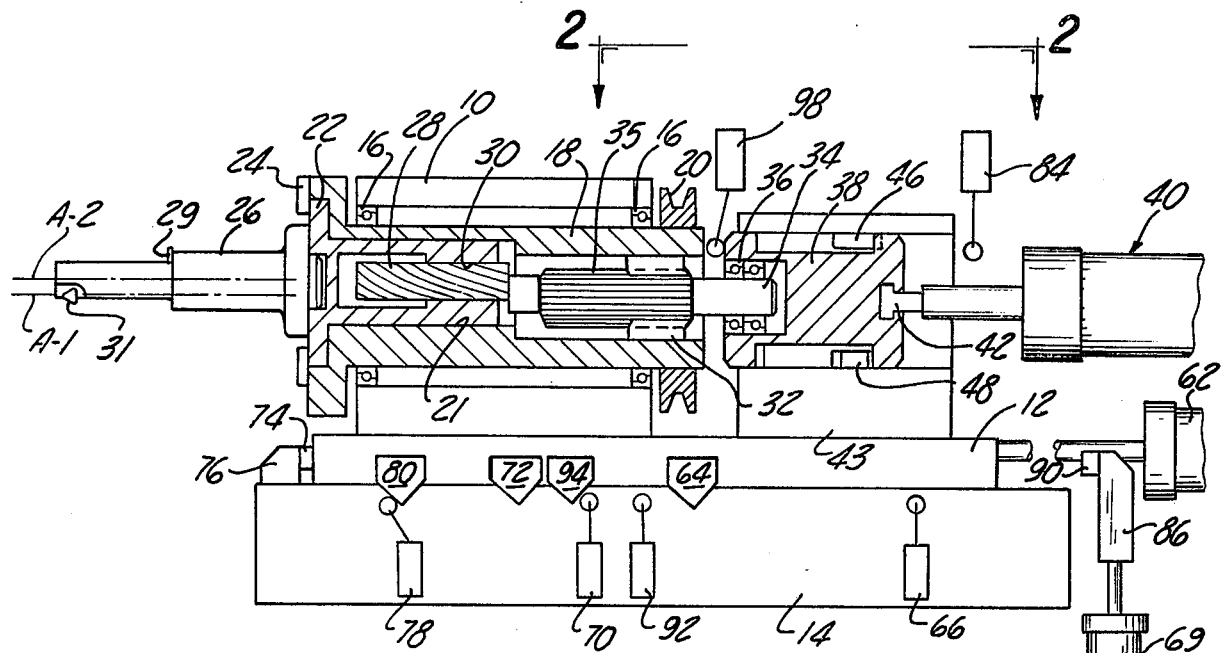
FIG. 1 is a diagrammatic partial cross section of a machine tool having a boring spindle embodying the present invention.

In FIG. 1 there is illustrated one form of machine tool embodying the invention. The machine includes a spindle housing 10 mounted on slide 12, which in turn is mounted for rectilinear sliding movement on base 14. Journalled in housing 10 by bearings 16 is a hollow spindle 18 rotationally driven by a pulley 20 which receives its power from a motor and belt (not illustrated). Spindle 18 rotates about an axis A-1. Mounted in the bore 21 of spindle 18 is a flanged nut 22 secured loosely by retainer 24 to allow it to rotate within the spindle, but tight enough not to allow end play. Mounted and fastened securely to the outer end of nut 22 is a boring bar 26 which carries two single point cutting tools 29 and 31. Tools 29, 31 are mounted on boring bar 26 in generally diametrically opposed relation. The axis of rotation of nut 22 and boring bar 26 is designated A-2 and is radially offset from the axis A-1 of the spindle 18 a selected distance. The other end of nut 22 is formed with internal helical splines 30 that are engaged by mating helical splines 28 formed on an offset portion of a shaft 34. The axis of helically splined portion 28 coincides with axis A-2 and the straight splined portion 35 of shaft 34 has its axis coinciding with axis A-1.

Splined portion 35 engages a similarly splined insert 32 which is securely retained in the spindle 18. Insert 32 prevents any relative torsional shift between spindle 18 and shaft 34 while permitting relative axial movement therebetween. The helix angle of spline set 28 and 30 is approximately 30°. Any axial movement of shaft 34 will cause an angular displacement of nut 22 and tools 29, 31.

Shaft 34 is rotationally coupled to a cylindrical slide 38 by thrust bearings 36 which are so secured as to withstand the thrust forces imposed by a fluid cylinder 40 through T-slot coupling 42. Slide 38 is mounted for reciprocation in a block 43 fixed on slide 12. When splined shaft 34 is displaced axially by cylinder 40 through slide 38, it is prevented from rotating relative to spindle 18 by the engagement of the straight splined portion 35 with the splined insert 32 and the helically splined portion 28 in engagement with internal splines 30 will rotate nut 22 about axis A-2. If the diametrically opposed cutting tools 29, 31 on boring bar 26 are so arranged that their cutting edges lie on a diameter which passes through both axes A-1 and A-2 when shaft 34 is at one end of its stroke, the same condition will exist after the shaft travels to the other end of its stroke and nut 22 rotates 180°.

The offset mounting of boring bar 26 relative to spindle 18 is analogous to a crank with the boring bar as the handle. The rotation of nut 22 about axis A-1 does not change the throw of this crank geometry. Likewise, the distance between axes A-1 and A-2 does not change in response to rotation of the spindle. One purpose of rotating the boring bar relative to spindle 18 is to bring about a change in the radial distances between the cutting tips of tools 29, 31 and the center of rotation of spindle 18, that is, axis A-1.

As shown in FIG. 1, with the helically splined portion 28 fully advanced to the left the radial dimension between axis A-1 and the cutting tip of tool 29 is greater than the radial dimension between axis A-1 and the tip of tool 31. When the helically splined portion 28 is retracted to the right to cause nut 22 to rotate 180°, the relative positions of each tool will be reversed. It should be understood that the foregoing relationships are not dependent on the difference in radial spacing of tools 29, 31 relative to axis A-2. The positions of tools 29, 31 relative to axis A-2 has another purpose later to be described.

Figure 4:
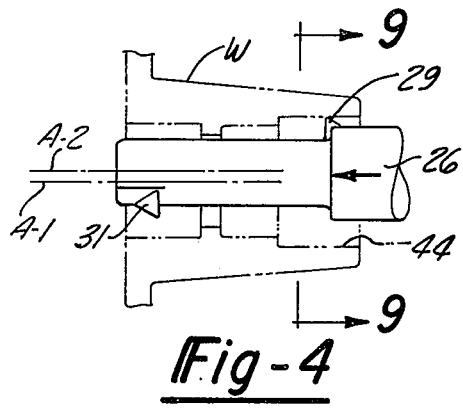
FIGS. 4, 5, 6 and 7 are views showing the progression of the boring bar on the workpiece being machined.
Figure 9:
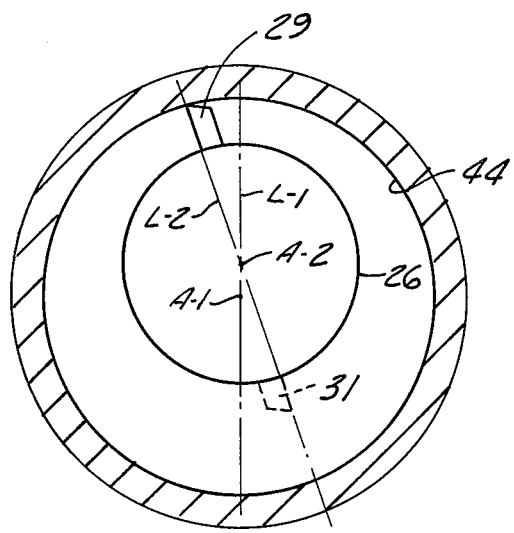
FIG. 9 is a section along line 9—9 in FIG. 4.

Referring to FIGS. 4 and 9, tool 29 is shown in a position for machining the bore 44 of a workpiece W. In the foregoing explanation reference was made to the positioning of the tools with their cutting faces lying on a line that passes through both axes A-1 and A-2, shown here as L-1. For the purpose of changing the size of bore 44, boring bar 26 can be rotated relative to spindle 18 about axis A-2, thus, changing the radial location of cutting tool 29 relative to axis A-1. It can be seen from FIG. 9 that, if the cutting tool were placed on line L-1, a considerable axial movement of shaft 34 would be required to displace tool 29 radially an appreciable amount relative to axis A-1. The rate of radial displacement of tool 29 would be minimum if it were located on line L-1 and would be maximum if the tool were located at 90° to L-1. Therefore, the initial location of the tool has been selected to lie on a line L-2 angularly displaced some distance (for example, 20°) from L-1, depending on the desired rate of displacement of the tool in relation to the axial displacement of shaft 34. It follows that a radial displacement of the cutting tool from its initial position relative to axis A-1 will produce a change in the diametrical size of the hole 44 that is being bored.

The radial location of tools 29, 31 relative to axis A-1 is determined by the axial position of splined portion 28 in FIG. 1. The axial displacement limits of splined portion 28 are determined by a wedge 46 abutting the stop 50 in the fully advanced position of splined portion 28 and by wedge 48 abutting a stop 60 in the fully retracted position of splined portion 28. Stops 50 and 60 are fixedly mounted on slide 38 in axially spaced relation.

Figure 2:
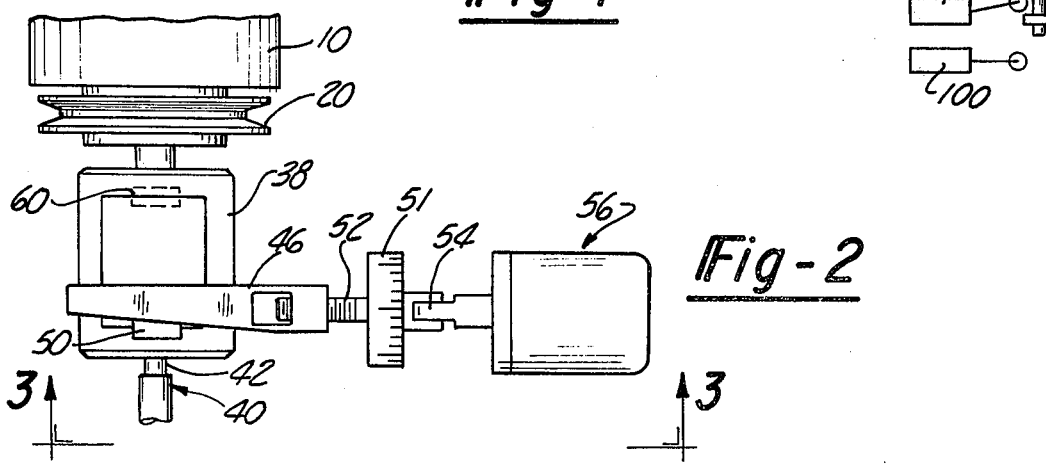
FIG. 2 is a fragmentary view along line 2—2 in FIG. 1.

As shown in FIG. 2, when splined portion 28 is fully advanced wedge 46 abuts stop 50. Thus, wedge 46 controls the circular position of cutting tool 29 and determines the diameter that it is boring. The transverse location of wedge 46 is controlled through a screw 52 and coupler 54 by the rotation of motor 56 which may be one of a variety of types which have the ability to give a precise increment of the output shaft rotation in response to a signal received from a control system which is initiated by automatic gaging of a previously machined part or by other means, such as a manual push button. The output of motor 56 has the ability to turn screw 52 in either direction and therefore to adjust the tool in and out, making the bore of the next workpiece either larger or smaller Thus, when the gaging mechanism determines that the bore of a workpiece is approaching the tolerance limits, it effects adjustment of the proper wedge. The timing of this adjustment is programmed by suitable controls so that it will take place at a time when slide 38 is somewhere in mid-travel of its stroke and wedges 46, 48 are not being contacted by stop 50 or 60. Mounted on screw 52 is a graduated dial 51 used for manually adjusting the position of wedge 46 for any reason, such as tool changing and setting.

Figure 3:
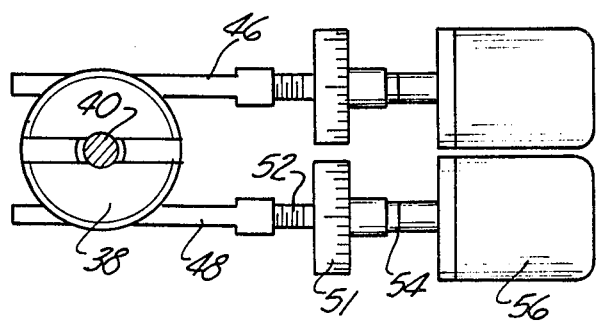
FIG. 3 is a fragmentary view along line 3—3 in FIG. 2.

When the sliding members are shifted to the right to the retracted position, boring bar 26 will be rotated through an angle of preferably less than 180°, thus retracting tool 29 and advancing tool 31 relative to axis A-1. This will bring tool 31 into cutting position and its position determined by stop 60 on slide 38 abutting wedge 48, FIGS. 2 and 3. The position of wedge 48 is determined by an identical screw and motor combination as wedge 46 and is controlled in the same manner. Wedges 46, 48 and their actuating mechanisms are mounted on slide 12.

Figure 8:
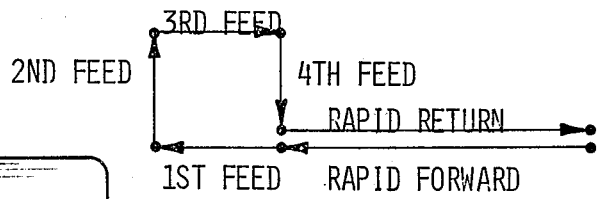
FIG. 8 shows a diagram of the machining sequence.

Referring to FIG. 1, slide 12 is shown in the full forward or advanced position and slide 38 also in the fully advanced position. For the purpose of following the cycle sequence as shown in FIG. 8, it can be seen that the cycle starts with the stop cylinder 68 lowered and slide 12 returned to the fully retracted position by cylinder 62 where switch dog 64 has actuated switch 66 to signal that slide 12 is fully retracted and in a safe position for the finished workpiece to be transferred out and a new part to be transferred into the work station. Cylinder 62 will then advance slide 12 rapidly until switch 70 is actuated by dog 72. This will signal slide 12 to advance at the feed rate. At this time wedge 46 is abutted by stop 50 so that tool 29 is in its radially outermost position in relation to the position of wedge 46. During the first feed, tool 29 will be machining bore 44 as shown in FIGS. 4 and 9. This advance at the feed rate will continue until fitting spacer 74 of stop 76 on base 14 is contacted by slide 12.

Figure 5:
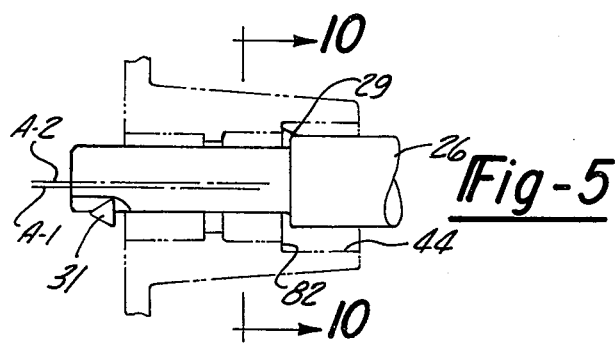
Figure 6:
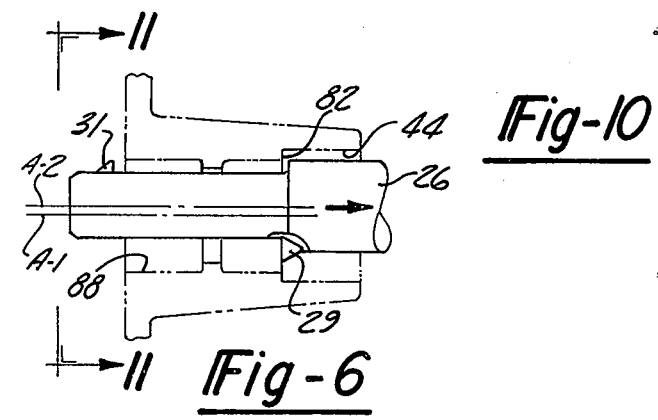
Figure 10:
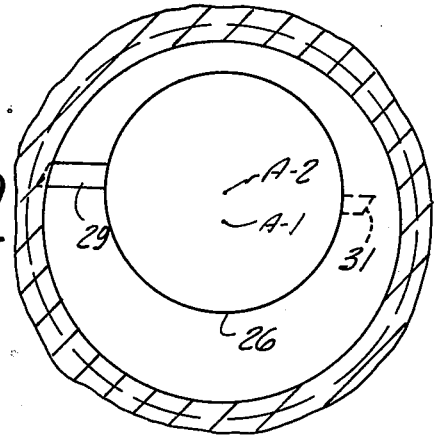
FIG. 10 is a section along line 10—10 in FIG. 5.
Figure 7:
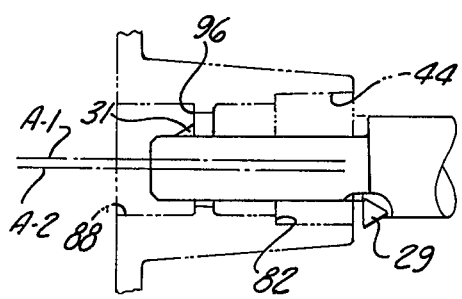
Figure 11:
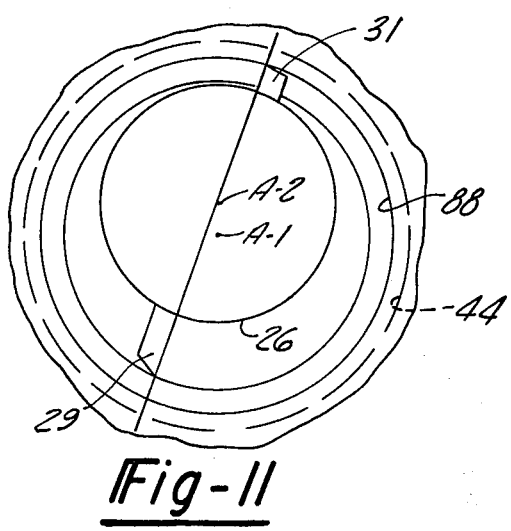
FIG. 11 is a view along line 11—11 in FIG. 6.

When slide 12 engages spacer stop 76 switch 78 is actuated by dog 80 and the signal thereby produced will call for a command from the machine controls for cylinder 40 to retract and thus rotate the boring bar 26 relative to spindle 18 at a desired rate that will feed tool 29 radially inwardly across the face of shoulder 82 as shown in FIGS. 5 and 10. This is designated as "2nd Feed" in FIG. 8. When this is finished, bar 26 having rotated through less than 180° relative to spindle 18, wedge 48 will be contacted by stop 60 (FIGS. 2 and 3), setting the size for the 3rd feed (as shown in FIGS. 6 and 11) with tool 31 adjusted in its boring position to machine bore 88. Switch 84 will have been actuated by slide 38 to signal the machine controls to instruct slide cylinder 62 to retract at the 3rd feed rate. Also, stop cylinder 68 will be actuated to raise stop 86 and fitting spacer 90 until switch 91 is energized. During the 3rd feed tool 31 will machine bore 88 until stop spacer 90 is contacted by slide 12. At this point switch 92 is energized by dog 94 and in series with switch 91 will initiate a signal to direct cylinder 40 to advance. As slide 38 advances, cutting tool 31 will retract radially in a manner to execute the 4th feed and face shoulder 96 of the workpiece as shown in FIG. 7. Tool 31 retracts until cylindrical slide 38 is again stopped by wedge 46 and actuates switch 98. This will initiate the lowering of stop cylinder 68 and in turn switch 100 will be made, signalling the rapid return of slide 12 to its retracted starting position. The switches and dogs on slide 12 and base 14 are shown diagrammatically and in practice are so arranged by offsetting or by the use of swing dogs so that only the proper switch and in the correct direction is energized, as described in this disclosure.

The dimensional relation between slide 38 and switches 84 and 98 is always changing due to tool position adjustment. This being the case, these switches might call for the 2nd or 4th feed to start before the 1st or 3rd feed has finished. This problem can be overcome by having switches 84, 98 activate timers which will allow enough time for the 1st and 3rd feed to finish before the timers signal the 2nd and 4th feed to begin. The design of particular electrical and hydraulic circuits of the machine controls may vary widely. Since the design and arrangement of such controls are well known in the art of machine tools, they are not shown and specifically described.

It will be noted in FIG. 7 that tools 29 and 31 are both clearing all finished surfaces and no back tool lines will be generated when boring bar 26 is retracted in rapid.

It will also be appreciated that by initially locating the tools so that they are angularly offset from a line passing through axes A-1 and A-2, both positive and negative size compensation can be obtained. This is further enhanced by positioning the two tools radially on the boring bar such that rotation of the boring bar relative to the spindle through an angle of less than 180° is effective to displace the two tools to the two desired cutting diameters. In this manner the degree of size compensation can be maximized within practical limits.

We claim:

1. In a machine tool of the type comprising a support, a spindle journalled on said support for rotation about a fixed first axis, means for rotating said spindle, a tool holder mounted on said spindle and means associated therewith for rotative adjustment of said tool holder on said spindle about a second axis parallel to and spaced from said first axis, a pair of cutting tools mounted on said tool holder in circumferentially spaced relation, and a member movable in opposite directions and operatively connected with said rotative adjustment means for rotating said tool holder on said spindle about said second axis whereby to radially retract one tool and radially project the other tool relative to said first axis, that improvement which comprises, a pair of abutment means spaced apart in the path of movement of said movable member for limiting movement of said member in opposite directions and means for individually adjusting said abutment means to vary the locus of the opposite ends of the stroke of said member and thereby individually adjust the radially outermost position of each cutting tool.

2. The combination called for in claim 1 wherein the tools are spaced different radial distances from said second axis.

3. The combination called for in claim 1 wherein said tools are spaced axially apart on said tool holder.

4. The combination called for in claim 3 wherein said tools are shaped to cut in both axial and radial directions and including means for moving said spindle support axially.

5. The combination called for in claim 1 wherein the abutment means are adjustable to positions wherein the full stroke of said member produces rotation of said tool holder relative to said spindle through an angle of less than 180°.

6. The combination called for in claim 1 wherein said member is movable in a rectilinear path.

7. The combination called for in claim 6 wherien each of said abutment means comprises a wedge having a stop face inclined at an acute angle to the path of travel of said member, said member having a pair of stop faces thereon engageable by the stop faces of said wedges at the opposite ends of the stroke of said member.

8. The combination called for in claim 7 including means for shifting said wedges in a direction transversely of the path of travel of said member.

9. The combination called for in claim 8 wherein said member comprises a slide axially aligned with said spindle and connected to the spindle so that the spindle can rotate relative to the slide.

10. The combination called for in claim 8 including a rotary motor for each of said wedges, a screw having a threaded connection with each wedge, said screws being connected to be rotated by said motors.

11. The combination called for in claim 1 wherein said tools are disposed on said tool holder in generally diametrically opposed relation with respect to the axis of the tool holder, said abutment means being positioned such that when said member is at the opposite ends of its stroke the tools are angularly displaced from a plane passing through the axis of the tool holder and the axis of the spindle.

12. The combination called for in claim 11 wherein said angular displacement amounts to at least 20°.

13. The combination called for in claim 12 wherein said abutment means are spaced apart such that the full stroke of said member produces rotation of said tool holder relative to said spindle through an angle of less than 180°.

14. The combination called for in claim 13 wherein said angle of rotation is not more than about 160°.

* * * * *